Sept. 8, 1959

J. H. GUYTON 2,903,636

TRANSISTOR INVERTER AND RECTIFIER CIRCUIT

Filed Nov. 14, 1955

INVENTOR.
James H. Guyton
BY E. W. Christen
ATTORNEY

United States Patent Office 2,903,636

Patented Sept. 8, 1959

2,903,636

TRANSISTOR INVERTER AND RECTIFIER CIRCUIT

James H. Guyton, Kokomo, Ind., assignor to General Motors Corporation, Detroit, Mich., a corporation of Delaware Application November 14, 1955, Serial No. 546,678

6 Claims. (Cl. 321—2)

This invention relates to transistor circuits and more particularly to an improved inverter and rectifier combination utilizing a transistor oscillator.

In transistor oscillators employing an inductance such as a transformer winding in the output circuit, the transistor device is subject to a high inverse voltage between transistor electrodes upon collapse of the magnetic field of the inductance. As is well known, excessively high voltages impressed across transistor electrodes have a destructive effect upon the transistor. This effect is especially pronounced in transistor oscillators of the type employing inductive feedback coupling between the output and input circuits and transformer coupling to a succeeding stage such as that described and claimed in United States application S.N. 512,176, filed May 31, 1955, in the names of James H. Guyton and Kenneth S. Vogt and assigned to the assignee of the present invention.

Accordingly, it is an object of this invention to provide an inverter circuit utilizing a transistor oscillator having a rectifier circuit associated therewith adapted to limit the inverse voltage applied to the transistor electrodes.

A further object is to provide an inverter and rectifier circuit which utilizes a transistor oscillator and which is effective to reduce the inverse voltage across the transistor electrodes permitting operation at higher power without additional components or modification of the circuit configuration.

An additional object is to provide a full wave rectifier circuit which is transformer coupled to a transistor oscillator and which is adapted to dissipate a portion of the energy stored in the transformer coupling to reduce the inverse voltage on the transistor electrodes.

In the accomplishment of these objects there is provided a full wave rectifier circuit in which one of the rectifing devices has a predetermined Zener point or breakdown voltage and is thereby adapted to conduct in the reverse direction upon the application of a predetermined voltage. Thus during that portion of the oscillator cycle in which the magnetic field of the circuit inductance collapses, the rectifying devices permit a circulating current in the rectifier circuit and hence dissipation of a portion of that energy which contributes to inverse voltages.

A more complete understanding of the invention may be had from the detailed description which follows taken with the accompanying drawings in which.

Figure 1:
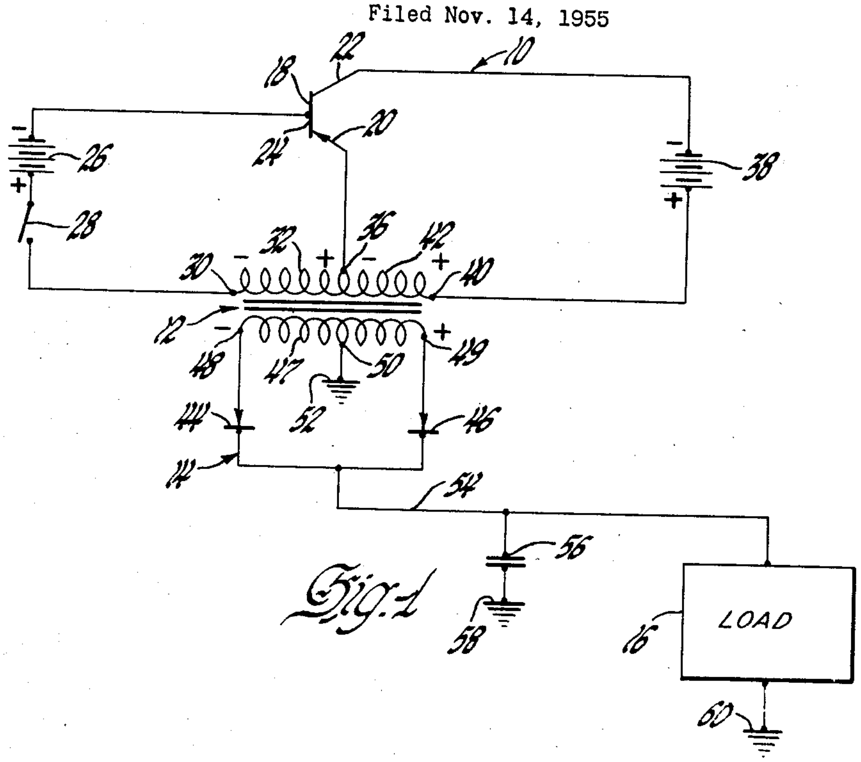
Figure 1 is a schematic diagram of the inventive inverter and rectifier circuit.

Referring now to Figure 1 there is shown an illustrative embodiment of the invention in an electronic inverter adapted to develop a unidirectional voltage of high value from a unidirectional voltage of low value. In general, the system comprises a transistor oscillator 10 coupled by a transformer 12 to a rectifier circuit 14 which supplies a load device 16.

The oscillator 10 utilizes a transistor 18 having an emitter electrode 20, collector electrode 22 and base electrode 24. In the illustrative embodiment the transistor is of the P–N–P configuration in which the emitter and collector are of P-type material having holes as the majority carriers and the base is of N-type material having electrons as majority carriers. It will be apparent that the transistor may be either the point contact type or the junction type or an N–P–N configuration may be employed if desired with a suitable reversal of polarities. In the transistor oscillator, the input circuit extends from the base electrode 24 through a conductor to the negative terminal of bias voltage source or battery 26 and thence from the positive terminal through a switch 28 to one terminal 30 of a feedback winding 32 of transformer 12. The input circuit is completed by connection of the winding terminal or tap 36 through a conductor to emitter electrode 20. The output circuit of the transistor oscillator 10 extends from collector electrode 22 through a conductor to the negative terminal of the supply voltage source or battery 38 and thence from the positive terminal to the terminal 40 of primary winding 42 of transformer 12. The output circuit is completed by connection of the winding tap 36 to emitter electrode 20.

In order to transform the output voltage of the transistor oscillator 10 to a suitable value, preferably a high value compared to the voltage of battery 38, the transformer 12 is provided with a secondary winding 47. The rectifier circuit 14 is energized by the secondary winding 47 and will be described subsequently.

At this point, operation of the oscillator circuit 10 under no load conditions will be discussed briefly in order to aid in explanation of the remainder of the system. A no load condition obtains, of course, when the transformer secondary winding 47 is open circuited. A similar no load condition may occur in operation; for example, where the load device 16 is constituted of vacuum tube plate circuits, the load will draw substantially no current during the warm-up interval of the tubes. Upon closing the switch 28, the input circuit path is completed, permitting a starting current to flow from the bias voltage source 26 in the low resistance direction from the emitter electrode 20 to the base electrode 24. This starting current effectively decreases the impedance between the emitter electrode 20 and the collector electrode 22 and an initially small current flows in the output circuit. An applied voltage with the polarity indicated appears across the primary winding 42 and by virtue of inductive coupling, a feedback voltage with like polarity is developed across winding 32. This feedback voltage causes additional current to flow from the emitter to the base electrode and as a result the current from emitter to collector electrode increases. This action is cumulative and the current in the output circuit increases exponentially to a limiting value determined by the circuit parameters. At this limiting value, the feedback voltage decreases toward zero and will no longer sustain emitter to collector current and the output circuit current commences to decrease abruptly, terminating the conductive or first half-cycle. At this point the magnetic field of transformer 12 collapses, reversing the polarity of the voltage across the transformer windings 32 and 42 during the non-conductive or second half-cycle. The succeeding cycle is initiated in the same manner as that described and the action is repetitive at a high rate, producing sustained oscillations in the output circuit. During the second half-cycle of each oscillation when the magnetic field of the transformer collapses, the voltage developed thereby tends to rise to an excessive value because of the circuit impedance across the transformer terminals. This excessive voltage appears across the emitter and collector electrodes and across the emitter and base electrodes with a polarity tending to cause current flow in the high impedance direction. Such excessive voltages are known to have a destructive effect upon the transistor characteristics.

In accordance with this invention, means are incorporated in the rectifier circuit 14 to prevent the occurrence of destructive inverse voltages on the transistor electrodes. The rectifier circuit is of the full wave type utilizing a pair of unidirectional conductive devices or diodes 44 and 46 connected back to back across the terminals 48 and 49 of the secondary winding 47 of the transformer 12. The secondary winding 47 is provided with a center tap 50 connected to a point of common reference potential or ground 52. The rectified output voltage is derived from the rectifier circuit 14 by a conductor 54 connected to a point intermediate the diodes 44 and 46, and a filter condenser 56 is connected between the conductor 54 and ground 58. The load device 16 of any desired type such as the plate circuits of vacuum tube apparatus is connected between the conductor 54 and ground 60.

Figure 2:
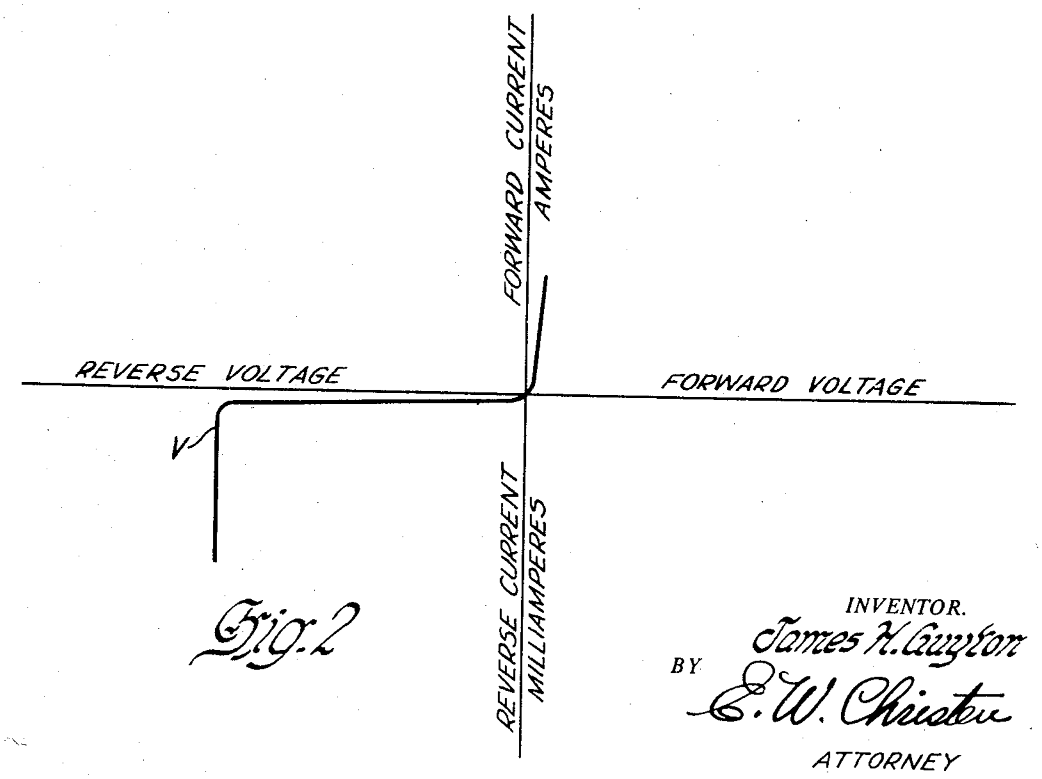
Figure 2 illustrates typical characteristics of a suitable rectifying device which may be employed in the practice of the invention.

Referring again to the rectifier circuit 14, the diode 44 may be of conventional structure such as a semi-conductor rectifier and is connected between terminal 48 and conductor 54. The polarity of the connection is such that the diode 44 will conduct current in the forward or low impedance direction, that indicated by the arrow head symbol, during the inverse voltage or non-conductive half-cycle of the oscillator 10. The diode 46 is connected between terminal 49 and conductor 54 with the proper polarity to conduct in the low impedance or forward direction during the conductive half-cycle of the oscillator 10. The diode 46 is of the type known as a Zener diode, which has a reverse breakdown voltage of predetermined value. This characteristic is illustrated in Figure 2 which illustrates that the reverse voltage characteristic has a sharp knee at a predetermined value of voltage V, known as the Zener point or voltage. At this value of reverse breakdown voltage, the current conduction of the device increases abruptly without further increase of voltage and the diode becomes essentially a constant voltage device. The actual value of the breakdown voltage V, is preferably selected to permit breakdown upon the occurrence of load voltage in the range of 120% to 200% of the rated load voltage of the load device 16 which the rectifier is adapted to supply. In any case, the actual value of breakdown voltage is sufficiently low to limit the inverse voltages on the electrodes of transistor 18 to a non-destructive value. Therefore, the effective value of the breakdown voltage should be equal to or less than the value of permissible inverse voltage on the transistor electrodes. The actual value of breakdown voltage V, of the diode 46 which will have an effective value properly related to the permissible value of inverse voltage may be established by consideration of the particular circuit. Upon collapse of the magnetic field of the transformer 12, the voltage developed across diode 46 is related to the voltage appearing across transistor electrodes 20 and 22, for example, by a factor which will be termed herein the voltage transfer factor, the value of which depends upon the circuit parameters. In the illustrative embodiment, the so-called voltage transfer factor will be substantially equal to the turns ratio of the transformer windings 42 and 47. In other words, the voltage across diode 46 will be substantially equal to the voltage across electrodes 20 and 22 times the ratio of turns in winding 42 to the turns in winding 47. Therefore, the breakdown voltage of diode 46 should be equal to or less than the permissible inverse voltage rating across transistor electrodes 20 and 22 times the transfer factor of the associated circuit. The manner in which this is effective to limit the inverse voltage to a non-destructive value will be set forth in the description of operation of the rectifier circuit 14.

In operation of the oscillator, as previously described, the voltage developed across the terminals of the secondary winding 47 during the conductive half-cycle is of the polarity indicated in Figure 1. During this half-cycle, the diode 46 is conductive in the forward or low impedance direction and the transformer voltage developed across terminal 49 and ground 52 is applied through diode 46 and across the filter condenser 56 and load 16 to ground. During the non-conductive half-cycle of the oscillator 10, which occurs during the collapse of the magnetic field of the transformer 12, the voltage is of a polarity opposite that shown in Figure 1. This voltage, which tends to rise to an excessive value and which appears between ground 52 and terminal 48, is applied through diode 44 and across the filter condenser 56 and load 16 to ground. During this half-cycle, voltage of the same polarity but of greater magnitude appears between terminals 49 and 48 which is applied to the series circuit including the diode 44, in the forward direction, and the Zener diode 46, in the reverse direction. When this voltage exceeds the breakdown voltage of the Zener diode 46 it becomes more conductive and a circulating current is permitted to flow in the series circuit including the diodes 44 and 46. This action effectively decreases the impedance of the circuit connected across transformer secondary terminals 48 and 49. A corresponding decrease of impedance appears across transformer terminals 36 and 40 and terminals 30 and 36 which permits dissipation of the energy stored in the magnetic field of the transformer at a greater rate. As a result, the voltage developed by the collapsing magnetic field is substantially decreased and the voltages applied to the transistor electrodes are limited to a non-destructive value.

This action is especially desirable during operating periods of light load or no load. Under such conditions the secondary terminals 48 and 49 are substantially open circuited and the impedance effectively connected across the terminals of windings 32 and 42 is of very high value consisting primarily of the inter-electrode impedances of the transistor 18. As a result, the inverse voltages tend to become exceedingly high. However, the Zener diode 46 is effective regardless of the load condition to limit the voltages. Under operating conditions with a normal load, the value of load voltage is not adversely affected by the Zener diode 46 since the breakdown voltage thereof is at a desired predetermined value above rated load voltage.

Although this description has been given with respect to a particular embodiment, it is not to be construed in a limiting sense upon the scope of the invention. Many variations and modifications within the spirit and scope of the invention will now occur to those skilled in the art. For a definition of the invention, reference is made to the appended claims.

I claim:

1. In combination, an oscillator including a transistor having an output circuit extending between selected electrodes and including an inductive device and being alternately conductive and substantially non-conductive by variation of the impedance between the electrodes whereby an inverse voltage is developed across the electrodes by the inductive device during the non-conductive interval, said transistor being subject to destructive effects by an inverse voltage across its electrodes greater than a predetermined value, a rectifier circuit coupled to the output circuit and including a rectifying device poled for forward conduction during the conductive interval of the output circuit, said rectifying device having an effective value of reverse breakdown voltage greater than zero but less than said predetermined value of inverse voltage.

2. In combination, a low voltage direct current source, a transistor oscillator energized from said source and developing an oscillating current in an output circuit thereof, the transistor of said oscillator being subject to destructive effects by inverse voltages greater than a predetermined value, a transformer having a primary winding in said output circuit and a secondary winding for developing a relatively high value of alternating voltage, a rectifier circuit connected across the secondary winding including a diode poled to conduct in the forward direction during the conductive interval of the transistor oscillator and having an effective value of reverse breakdown voltage greater than zero but less than the predetermined value of inverse voltage.

3. An oscillator including a transistor having an input circuit extending between base and emitter electrodes and an output circuit extending between collector and emitter electrodes, said output circuit being alternately conductive and non-conductive in accordance with the varying bias conditions of the input circuit, a transformer having a primary winding in said output circuit whereby an inverse voltage is developed across the emitter and collector electrodes during non-conductive intervals of the output circuit, a secondary winding on the transformer, and a circuit connected across the secondary winding including a rectifying device poled for forward conduction during the conductive interval of the output circuit and having a reverse breakdown voltage such that said inverse voltage is limited to a non-destructive value.

4. An electronic circuit comprising a transistor having an input circuit extending between base and emitter electrodes and an output circuit extending between collector and emitter electrodes, said output circuit including an inductive device and being alternately conductive and substantially non-conductive in accordance with varying voltage conditions in said input circuit whereby an inverse voltage is developed by collapse of the magnetic field of the inductive device during the non-conductive intervals, a rectifier circuit connected across the inductive device including a rectifying device poled for forward conduction during conductive intervals of the output circuit, and a load device having a rated voltage greater than zero and connected to the rectifier circuit, said rectifying device having a reverse breakdown voltage greater than said rated voltage but less than the inverse voltage rating of the transistor electrodes times the voltage transfer factor between said output circuit and said rectifier circuit.

5. In combination an oscillator including a transistor having an input circuit extending between base and emitter electrodes and an output circuit extending between collector and emitter electrodes, said output circuit being alternately conductive and substantially non-conductive in accordance with the bias condition of the input circuit, a transformer having a primary winding connected in said output circuit and a feedback winding connected in said input circuit inductively coupled to the primary winding whereby inverse voltages are applied to the base and collector electrodes during the non-conductive interval of the output circuit, a secondary winding on the transformer, and a rectifier circuit connected across the secondary winding including a rectifying device poled for forward conduction during the conductive interval of the output circuit and having a reverse breakdown voltage of predetermined value to limit the inverse voltages to non-destructive values.

6. In combination an oscillator including a transistor having an input circuit extending between base and emitter electrodes and an output circuit extending between collector and emitter electrodes, said output circuit being alternately conductive and substantially non-conductive in accordance with bias conditions of the input circuit, a transformer having a primary winding connected in said output circuit and a feedback winding connected in said input circuit whereby inverse voltages are applied to the base and collector electrodes during the non-conductive interval of the output circuit, a secondary winding on the transformer, a full wave rectifier connected across the secondary winding including first and second rectifying devices connected back-to-back, the first rectifying device being poled for forward conduction during the conductive interval of the output circuit and the second rectifying device being poled for forward conduction during the non-conductive interval of the output circuit, said first rectifying device having a reverse breakdown voltage of predetermined value greater than rated load voltage and less than the value required to limit the inverse voltages to a non-destructive value.

References Cited in the file of this patent

UNITED STATES PATENTS 2,791,739 Light ------------------ May 7, 1957

OTHER REFERENCES

Riddle: "Transistors in Telemetry," Electronics, January 1954, pp. 178–180.

Pearlman: "Transistor Power Supply for Geiger Counters," Electronics, August, 1954, pp. 144–145.